United States Patent
Brouwer

(10) Patent No.: US 10,467,429 B2
(45) Date of Patent: Nov. 5, 2019

(54) SYSTEMS AND METHODS FOR SECURE USER PROFILES

(71) Applicant: Faraday & Future Inc., Gardena, CA (US)

(72) Inventor: Michael Lambertus Hubertus Brouwer, Los Gatos, CA (US)

(73) Assignee: FARADAY & FUTURE INC., Gardena, CA (US)

(*) Notice: Subject to any disclaimer, the term of this patent is extended or adjusted under 35 U.S.C. 154(b) by 0 days.

(21) Appl. No.: 15/703,968

(22) Filed: Sep. 13, 2017

(65) Prior Publication Data

US 2018/0260582 A1 Sep. 13, 2018

Related U.S. Application Data

(60) Provisional application No. 62/394,605, filed on Sep. 14, 2016.

(51) Int. Cl.
| | |
|---|---|
| *G06F 21/62* | (2013.01) |
| *H04L 9/32* | (2006.01) |
| *H04L 9/08* | (2006.01) |
| *H04L 29/08* | (2006.01) |
| *G06F 21/32* | (2013.01) |

(52) U.S. Cl.
CPC ......... *G06F 21/6245* (2013.01); *G06F 21/32* (2013.01); *H04L 9/0822* (2013.01); *H04L 9/0894* (2013.01); *H04L 9/3231* (2013.01); *H04L 67/04* (2013.01); *H04L 67/12* (2013.01); *H04L 67/18* (2013.01); *H04L 67/306* (2013.01)

(58) Field of Classification Search
CPC ... G06F 21/6245; G06F 21/32; H04L 9/3231; H04L 9/0894; H04L 67/04; H04L 67/18; H04L 67/306; H04L 67/12; H04L 9/0822
See application file for complete search history.

(56) References Cited

U.S. PATENT DOCUMENTS

| | | | | |
|---|---|---|---|---|
| 9,608,813 | B1* | 3/2017 | Roth | H04L 9/0894 |
| 10,078,754 | B1* | 9/2018 | Brandwine | G06F 21/602 |
| 2003/0076955 | A1* | 4/2003 | Alve | G06F 21/10 |
| | | | | 380/201 |
| 2006/0149676 | A1* | 7/2006 | Sprunk | H04L 9/0822 |
| | | | | 705/50 |
| 2006/0206920 | A1* | 9/2006 | Kim | H04L 63/0428 |
| | | | | 726/2 |

(Continued)

*Primary Examiner* — Darren B Schwartz
(74) *Attorney, Agent, or Firm* — Skyler R. Lund

(57) ABSTRACT

Systems and methods for secure user profiles are disclosed. One example method includes the steps of receiving a user profile, the user profile comprising a plurality of domains, at least one of the domains having an associated encryption key and at least one associated data record, wherein the encryption key is encrypted according to a first encryption technique and wherein the at least one data record is encrypted according to a second encryption technique using the encryption key; transmitting a request for a decryption key to a first device, the decryption key usable by the first encryption technique to decrypt the encryption key; receiving the decryption key from the first device; decrypting the encryption key using the first encryption technique and the decryption key; decrypting the at least one data record using the second encryption technique and the encryption key.

10 Claims, 9 Drawing Sheets

(56) References Cited

U.S. PATENT DOCUMENTS

| | | | | |
|---|---|---|---|---|
| 2006/0236104 | A1* | 10/2006 | Wong | G06F 21/6227 |
| | | | | 713/168 |
| 2006/0242065 | A1* | 10/2006 | Jogand-Coulomb | G06F 21/10 |
| | | | | 705/50 |
| 2007/0028101 | A1* | 2/2007 | Koskins | G06F 21/121 |
| | | | | 713/165 |
| 2007/0118733 | A1* | 5/2007 | Boogert | H04L 9/0891 |
| | | | | 713/155 |
| 2007/0136606 | A1* | 6/2007 | Mizuno | G06F 21/78 |
| | | | | 713/189 |
| 2008/0229387 | A1* | 9/2008 | Baks | G06F 21/10 |
| | | | | 726/1 |
| 2008/0313468 | A1* | 12/2008 | Yoshikawa | H04L 63/0428 |
| | | | | 713/182 |
| 2010/0306530 | A1* | 12/2010 | Johnson | G06F 21/335 |
| | | | | 713/155 |
| 2010/0325732 | A1* | 12/2010 | Mittal | G06F 21/604 |
| | | | | 726/26 |
| 2011/0026713 | A1* | 2/2011 | Bellwood | G11B 20/00086 |
| | | | | 380/277 |
| 2011/0314279 | A1* | 12/2011 | Ureche | H04L 9/3228 |
| | | | | 713/167 |
| 2012/0096266 | A1* | 4/2012 | Fukuda | H04L 9/0833 |
| | | | | 713/168 |
| 2012/0185510 | A1* | 7/2012 | Desai | G06F 21/6281 |
| | | | | 707/785 |
| 2012/0257743 | A1* | 10/2012 | Van Der Veen | G06F 21/6218 |
| | | | | 380/44 |
| 2014/0325235 | A1* | 10/2014 | Thompson | G06F 21/6218 |
| | | | | 713/189 |
| 2016/0099923 | A1* | 4/2016 | Golla | H04W 12/04 |
| | | | | 713/171 |

* cited by examiner

```
100

<User_Profile>
        <Username>[Name]</Username>
110 → <Biometric_Parameters>
    112 → <Encrypted_Key>[Key Value]</Encrypted_Key>
                <Voice_Print>[voice print parameters</Voice_Print>
                <Fingerprint_1>[Right Thumb Print]</Fingerprint_1>
                <Fingerprint_2>[Left Thumb Print]</Fingerprint_2>
        </Biometric_Parameters>
120 → <Financial_Information>
    122 → <Encrypted_Key>[Key Value]</Encrypted_Key>
                <Credit_Card_1>[voice print parameters</Credit_Card_1>
                <Credit_Card_2>[Right Thumb Print]</Credit_Card_2>
                <Debit_Card_1>[Left Thumb Print]</Debit_Card_1>
        </Financial_Information>
130 → <Vehicle_Settings>
                <Cabin_Temp>[Preferred Cabin Temperature]</Cabin_Temp>
                <Seat_Height>[Preferred Seat Height]</Seat_Height>
                <Seat_Recline>[Preferred Recline Angle]</Seat_Recline>
                <Radio_Station_1>[Radio Station]</Radio_Station_1>
                <Radio_Station_2>[Radio Station]</Radio_Station_2>
                <Radio_Station_3>[Radio Station]</Radio_Station_3>
                <Radio_Station_4>[Radio Station]</Radio_Station_4>
                <Radio_Station_5>[Radio Station]</Radio_Station_5>
        </Vehicle_Settings>
</User_Profile>
```

410 → \<User_Profile\>
420 → \<Domain_0\>
422 → \<Domain_Location\>[Network location]\</Domain_Location\>
      \</Domain_0\>
430 → \<Domain_1\>
422 → \<Encrypted_Key\>[Key Value]\</Encrypted_Key\>
424 → \<Encryption_Function\>[Encryption Function]\</Encryption_Function\>
426 → \<Decryption_Function\>[Decryption Function]\</Decryption_Function\>
428 → \<Encrypted_Record\>[Record 1 Network Location]\</Encrypted_Record\>
      \<Encrypted_Record\>[Record 2]\</Encrypted_Record\>
      \<Encrypted_Record\>[Record 3]\</Encrypted_Record\>
      \<Encrypted_Record\>[Record 4]\</Encrypted_Record\>
      \</Domain_1\>
440 → \<Domain_2\>
      \<Encrypted_Key\>[Key Value]\</Encrypted_Key\>
      \<Encryption_Function\>[Encryption Function]\</Encryption_Function\>
      \<Decryption_Function\>[Decryption Function]\</Decryption_Function\>
      \<Encrypted_Record\>[Record 1]\</Encrypted_Record\>
      \<Encrypted_Record\>[Record 2]\</Encrypted_Record\>
      \<Encrypted_Record\>[Record 3]\</Encrypted_Record\>
      \<Encrypted_Record\>[Record 4]\</Encrypted_Record\>
      \</Domain_2\>
\</User_Profile\>

450

\<Domain\>
  \<Encrypted_Key\>[Key Value]\</Encrypted_Key\>
  \<Encryption_Function\>[Encryption Function]\</Encryption_Function\>
  \<Decryption_Function\>[Decryption Function]\</Decryption_Function\>
  \<Encrypted_Record\>[Record 1]\</Encrypted_Record\>
  \<Encrypted_Record\>[Record 2]\</Encrypted_Record\>
  \<Encrypted_Record\>[Record 3]\</Encrypted_Record\>
  \<Encrypted_Record\>[Record 4]\</Encrypted_Record\>
\</Domain\>

*FIG. 4*

SYSTEMS AND METHODS FOR SECURE USER PROFILES

CROSS-REFERENCE TO RELATED APPLICATIONS

This application claims the benefit of U.S. Provisional Application No. 62/394,605, filed Sep. 14, 2016, the entirety of which is hereby incorporated by reference.

BACKGROUND

Currently, a person seeking to provide personal information to a third party typically fills out a form, whether in person or on online, and enters data in to the various fields on the form and submits it to the third party. If another third party later requests the same or similar information, the person must again fill out a form with the requested information.

SUMMARY

Various examples are described for systems and methods for secure user profiles. For example, one example method includes the steps of receiving a user profile, the user profile comprising a plurality of domains, at least one of the domains having an associated encryption key and at least one associated data record, wherein the encryption key is encrypted according to a first encryption technique and wherein the at least one data record is encrypted according to a second encryption technique using the encryption key; transmitting a request for a decryption key to a first device, the decryption key usable by the first encryption technique to decrypt the encryption key; receiving the decryption key from the first device; decrypting the encryption key using the first encryption technique and the decryption key; and decrypting the at least one data record using the second encryption technique and the encryption key.

Another example method includes the steps of receiving a user profile, the user profile comprising a first domain and a second domain, the first domain having an associated encryption key, the second domain having an associated first data record; receiving a selection of the first data record and the first domain; associating the first data record with the first domain, and deassociating the first data record from the second domain; and encrypting the first data record using a first encryption technique and the encryption key.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 1 shows an example user profile according to the present disclosure;

FIG. 4 shows an example user profile according to the present disclosure;

DETAILED DESCRIPTION

Figure 2:
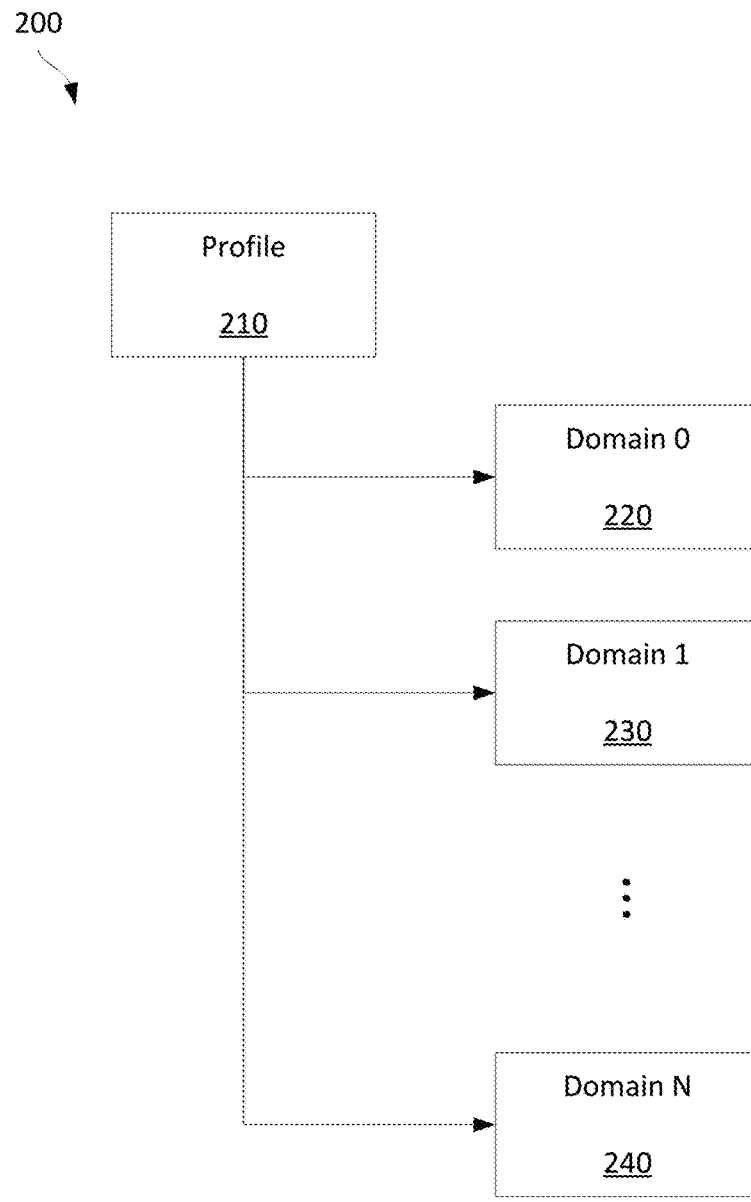
FIG. 2 shows an example logical diagram of a user profile according to the present disclosure.

Examples are described herein in the context of systems and methods for secure user profiles. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Illustrative Example Systems and Methods for Secure User Profiles

In one illustrative example, a person creates a user profile for herself to maintain and secure various personal information that same may desired to share, at some time, with other entities, such as to authenticate her identity, provide financial or billing information, or provide her preferences on a particular topic. The user profile can be provided to third parties, for example, to authenticate the person to the third party, to supply preference or payment information to the third party, or to share other personal information with the third party. Although a user is described as performing the various actions in this illustrative example, it should be appreciated that the user may perform all, some, or none of these actions in various embodiments. Similarly, a system and/or method may perform all, some, or none of the actions described in this illustrative example.

To create the user profile, the person, who will be referred to as the "data owner" in this example, activates a user profile editor and selects an option to create a new user profile. The user profile editor then creates an initial user profile that includes a single group, referred to as a "domain," within which the data owner can store various pieces of information. This initial domain for the user profile is the "top level" domain of the user profile. The data owner then establishes an initial set of information that can be used to identify the user profile and stores that information within the top level domain. In this example, the data owner creates data records for the data owner's name and for a unique identifier for the user profile. In addition, the editor provides her with different security options that can be assigned to the domain, including encryption and authentication options. However, the user elects to not employ such features on the top level domain.

The data owner then decides that she would like to store credit and debit card information within her user profile to allow for easy shopping on the internet. However, she would like to secure this payment information. Because she has elected no security options for the top level domain, she creates a new domain within the top level domain for financial information. Once the new domain has been created, she creates data records for each of her credit and debit cards, which each include the account number and expiration date of the corresponding credit or debit card. The data owner then elects to use encryption to secure the information stored within the payment information domain.

After selecting the encryption option, she is presented with a variety of symmetric key encryption techniques from which to choose, such as the Advanced Encryption Standard (AES) or the Data Encryption Standard (DES), and a key length. The user profile editor then generates a domain encryption key that can be used to encrypt and decrypt the data within the financial information domain, referred to as $K_{FI}$. In addition, the user profile editor generates a second encryption key, $K_{KFI}$, that is used to encrypt and decrypt the domain encryption key, $K_{FI}$. The data owner is then supplied with the second encryption key, $K_{KFI}$, while the domain encryption key $K_{FI}$, is stored in a data record within the financial information domain. The data owner is then provided the option, on one or more other devices, to receive a copy of the second encryption key, $K_{KFI}$, and she elects to store the second encryption key, $K_{KFI}$, on her smartphone and her tablet device.

The data owner, however, is not satisfied by the level of security provided by the encryption option. She is concerned that if she were to lose her smartphone, someone could access her financial information. So she elects a further security option to require a personal identification number ("PIN"). After selecting the authentication option, she is prompted to enter a PIN or to have one randomly generated for her. After obtaining the PIN, referred to as $PIN_{FI}$, she commits it to her own memory, but does not store it on any of her devices.

The data owner then, having recently bought a new car that allows different drivers to customize vehicle settings, such as climate control settings, radio settings, and seat settings, elects to store those settings within her user profile so that the settings can be automatically applied to her car when she enters it. So she creates a second domain of information for her vehicle settings. She then enters various data into the domain, such as her favorite radio stations, frequently-used addresses for the navigation system, and her preferred cabin temperature.

When prompted whether to provide security options for the vehicle settings domain, the data owner elects to employ encryption only. She is not concerned about others learning about her radio station presets, but does not wish any third party to have access to locations that she frequently visits, including her home address. After selecting the encryption option, she selects the desired encryption technique and generates a new encryption key, $K_{VS}$, for the vehicle settings domain. This new encryption key, $K_{VS}$, is stored within the vehicle settings domain, and a second encryption key, $K_{KVS}$, is generated to encrypt the vehicle settings encryption key, $K_{VS}$. The second encryption key, $K_{KVS}$, is then provided to her smartphone and tablet device.

After creating these domains, the data owner elects to finish with her user profile for the time being and selects an option to save the user profile. The editor then uses the respective encryption keys, $K_{FI}$ and $K_{VS}$, for the different domains to encrypt the information within the respective domain. The editor then further encrypts the domain encryption keys, $K_{FI}$ and $K_{VS}$. For the vehicle setting encryption key, $K_{VS}$, the editor uses the additional key, $K_{KVS}$, generated for the vehicle setting domain to encrypt the domain encryption key, $K_{VS}$. For the financial information domain, the editor encrypts the financial information encryption key, $K_{FI}$, using both the second encryption key, $K_{KFI}$, and the PIN, $PIN_{FI}$. Thus, after the encryption is completed, the data records within the financial information domain are encrypted using one encryption key, $K_{FI}$, while the domain's encryption key itself is encrypted using different information—$K_{KFI}$ and $PIN_{FI}$. Similarly, the data records within the vehicle settings domain are encrypted using the domain encryption key, $K_{VS}$, while the domain encryption key itself is encrypted by a different encryption key, $K_{KVS}$. The data owner's smartphone and tablet devices are supplied with these encryption keys, $K_{KFI}$ and $K_{KVS}$, and the data owner keeps in her own memory the PIN information, $PIN_{FI}$, needed to access the financial information domain.

The user profile, thus completed, is copied onto an internet network storage location that the data owner can access and share from any location, so long as she has access to the internet. When sharing her user profile, the data owner is able to selectively access or share information from within different domains with other entities, e.g., she may share credit card information with an online retail store, to obtain goods or services from the other entities, or to configure various customizable settings of devices or software without manually entering those settings.

This illustrative example is given to introduce the reader to the general subject matter discussed herein and the disclosure is not limited to this example. The following sections describe various additional non-limiting examples and examples of systems and methods for secure user profiles.

Referring now to FIG. 1, FIG. 1 shows an example user profile 100 similar to that discussed above with respect to the illustrative example. In this example, the user profile 100 is stored in an Extensible Markup Language-(XML) style format, though other formats may be employed. For example, the user profile 100 may be stored in one or more records in a database, such as a relational database or an object-oriented database, or may be distributed in multiple data files across multiple different storage locations or databases.

As can be seen, the user profile 100 includes several domains 110-130 of information, including a biometric parameter domain 110, a financial information domain, and a vehicle settings domain 130. Each domain 110-130 may include one or data records. For example, the biometric parameters category 110 includes a voiceprint record and two fingerprint records. In addition, domains may also have encryption keys associated with them, which may be employed to encrypt one or more data records within the domain, such as described above. Here, two of the domains—the biometric parameters domain 110 and the financial information domain 120—each have an associated encryption key 112, 122. In this example, each of these encryption keys 112, 122 is itself encrypted by another encryption key (not shown) that may be stored on a data owner's smartphone or tablet device, a wearable device (e.g., a smartwatch), a cloud location maintained by the data owner, or other suitable storage location.

Referring now to FIG. 2, FIG. 2 shows an example logical structure of a user profile 200. In this example, the user profile 200 is made up of a number of domains 210-240. The user profile 200, or portions of the user profile 200, may be, in some examples, mapped to a data structure, such as the data structure for the user profile 100 shown in FIG. 1.

However, the user profile 200 does not imply any particular design requirements for a data structure.

In this example, each domain 210-240 represents a collection of information. For example, one domain may be defined to have biometric information or parameters for an individual. Another domain may include the information about the user's home address, work address, or other information that is personal to the data owner and that the data owner desires to keep private, but readily accessible to the data owner. A further domain may include other personal information that is useful to the data owner, such as vehicle settings or preferences, but would not potentially compromise the data owner's financial well-being or safety.

The logical structure of the user profile 200 shown in FIG. 2 enables a data owner to create any number of domains as may be desirable for the information the data owner wishes to store. The example user profile 100 in FIG. 1 includes four example domains; however, these or others may be created in various examples according to each individual data owner's specific preferences. Thus, the specific information stored in, or referenced by, a particular domain 210-240 may be established according to the particular requirements of a system or according to a particular data owner's preferences. Further, the number of domains associated with a user profile 200 may vary from data owner to data owner.

The user profile 200 shown in FIG. 2 has a top level domain called the "Profile" 210. The Profile domain 210 may or may not include any information, but in some examples may include a person's name, account number, or a value that uniquely identifies the user profile. The Profile domain 210 may have additional domains 220-240 associated with it. In this example, the domains 210-240 are arranged hierarchically, with the Profile domain 210 as the root domain of the hierarchy, with the other domains 220-240 arranged as child domains of the Profile domain 210. While domains 220-240 are not shown as having their own respective child domains, such an arrangement, as well as an unrestricted number of further generations of children, is contemplated by this disclosure.

Figure 3:
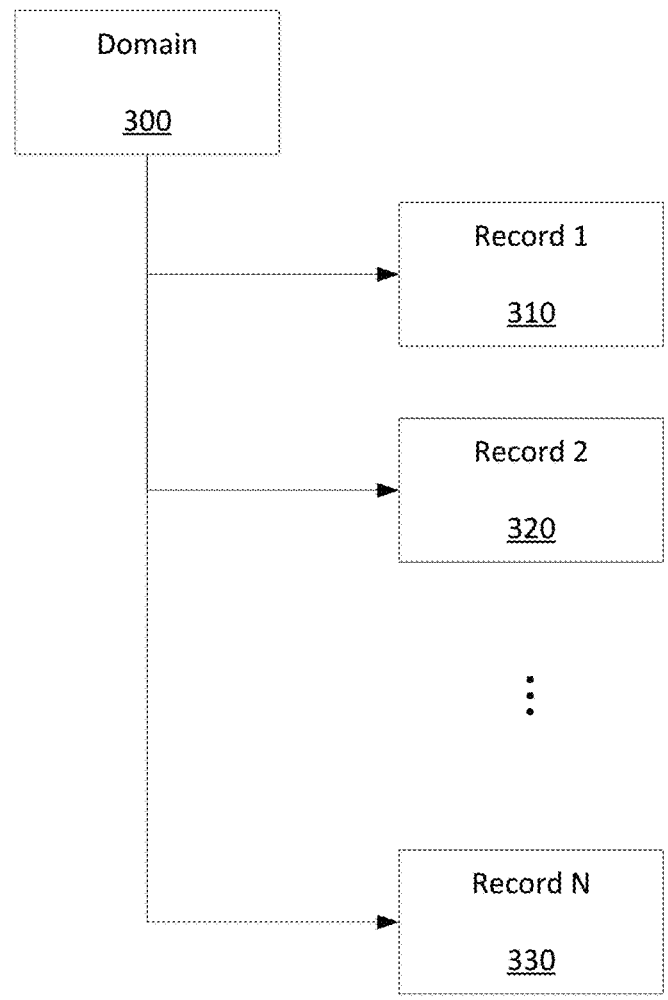
FIG. 3 shows an example logical diagram of a domain according to the present disclosure.

As discussed above, each of these additional domains may include information or references to information. Referring now to FIG. 3, FIG. 3 shows an illustration of a domain 300 having a number of data records 310-330. In this example, each data record stores or references some amount of information, which may include a "NULL" or similar data element to indicate that a record is empty. The information for each data record may be stored in a computer-readable medium ("CRM"), such as in random-access memory ("RAM"), or a non-volatile memory (e.g., a hard disk). These data records may be stored independently of any other data structure that represents a domain or multiple related domains. For example, the logical structure of a user profile may be represented in a data file, such as the XML-like file structure shown in FIG. 1, while information in each of the data records may be stored in different data files or different storage locations, e.g., different data structures in RAM, different records or tables in a database, etc.

Referring now to FIG. 4, FIG. 4 illustrates a data structure representing a user profile 400 similar to the user profile 200 domain arrangement shown in FIG. 2; however, in this example, the data structure contains references to certain information, rather than bodily incorporating the actual information into the data structure. As may be seen, the user profile 400 includes a "User Profile" domain 410, which is arranged as the root of a hierarchy of domains, which includes three child domains: Domain_0 420, Domain_1 430, and Domain_2 440.

While each of these child domains 420-440 includes multiple data records, the only record bodily incorporated in Domain_0 420 is a reference 422 to a network location. In this example, the reference 422 points to the domain 450 stored in another location different from the user profile 400. Thus, attempts to access data records in Domain_0 420, first must access the domain 450 at the network location identified in the reference 422.

In contrast to child domain 420, the other two child domains 430, 440 are bodily incorporated into the user profile. And as can be seen, each of these child domains 430, 440 includes multiple data records. However, one data record 428 in Domain_1 430 includes a reference to where the information within the data record 428 is stored, rather than storing the information within the data record 428 itself. Thus, to access the information in data record 428, the network location must be access to retrieve the information.

Further, as may be seen, the domains 420-440 each include an encryption key, an encryption function, and a decryption function. As discussed above, the use of domains can enable the logical grouping of data that share a common trait. In this example, one common trait includes desired level of privacy and security for information personal to the data owner of the user profile 400. Other common traits may be the types of data stored within a domain, such as biometric information, financial information, contractual information, personal preferences, navigation information, etc. It should be appreciated that, while a data owner may be a person, other types of data owners are contemplated, such as companies, vehicles, or electronic devices.

The use of the domain structure discussed throughout this disclosure may enable a data owner to effectively and efficiently protect their own data at a level that is appropriate to the data owner's particular wishes, which may be balanced between strong security for the data and a desire for minimal effort in providing access to the data to another entity. The effort required to access the data may be referred to herein as "friction," thus the more effort is required by the data owner to provide access to particular pieces or domains of data, the more "friction" there is.

Referring again to FIG. 4, as discussed above, the user profile 400 has three domains 420-440 associated with it. In this example, each of the domains has a different encryption scheme associated with it, such as the encryption records 422-426 in Domain_0 420. In this example, the encryption keys, e.g., encryption key 422, are the keys employed by the corresponding encryption or decryption functions, e.g., 424, for the respective domain. Each data record is, by default, encrypted while at rest and while in transit. Thus, the data within a data record may be decrypted when in use, but otherwise remains encrypted. This may reduce the opportunity for an unauthorized third party to access the data owner's data.

The term "at rest" used above will be generally used to mean data that is stored on a persistent storage device, e.g., a non-volatile computer-readable medium, as opposed to data in RAM or data being operated on by a processor. "In transit" generally refers to data that is moving between different computing devices. For example, data travelling across a data network is generally considered to be data that is "in transit." "In use" generally means that a data item is stored in RAM and is being applied or processed for a particular purpose. The foregoing is intended to give a non-limiting introduction to these terms of art, but they are not intended to redefine or change their conventional usages by those of skill in the art.

To access data stored in a data record of Domain_0 420, for example, the data from a data record is accessed and decrypted using the decryption function 426 and the encryption key 422 for Domain_0. Similarly, to encrypt data to be stored in a record of Domain_0 420, the data is encrypted using the encryption function 424 and encryption key 422 for Domain_0 420. Any suitable encryption scheme may be used, such as the Advanced Encryption Standard (AES) or Data Encryption Standard (DES), may be used.

Further, and as described above, the encryption key of each domain is encrypted according to an encryption scheme. The type of encryption scheme used for each domain's encryption key can vary based on the data owner's desired level of friction for data stored in each domain. For example, referring again to the user profile 100 of FIG. 1, the domains 110-130 represent different types of information that is personal to the data owner. The biometric parameters domain 110 includes data records with information that is highly personal to the data owner and is (highly likely to be) unique to that data owner. Further, such information may be used to gain access to other confidential information of the data owner, such as financial records, medical records, etc. Thus, a data owner may want to employ an encryption scheme that requires more effort on the data owner's part to access the biometric parameters domain 110 of the user profile 100, but that provides a greater level of security for the information. However, for information stored in the vehicle settings domain 120, the information, while personal to the data owner, is used for the data owner's convenience, e.g., to adjust vehicle settings when the data owner enters a vehicle. Encryption in this case may enable the data owner to prevent tampering with the vehicle settings, but unauthorized access may only result in an inconvenience to the data owner, such as entering new settings. Thus, an encryption scheme may be used to prevent tampering, but otherwise, the user may desire a low-friction encryption scheme for the vehicle settings.

To provide encryption schemes having varying levels of friction from the data owner's perspective, suitable encryption schemes may require the data owner to provide information to a computing device that attempts to access the user profile 100. For example, an encryption scheme to access the biometric parameters domain 110 or the financial information domain 120 may require the data owner supply an encryption key and an additional piece of information, such as a password or a PIN. When both the encryption key and the additional information are provided, a decryption function will accept as inputs the supplied encryption key and the additional information, and operate on the domain's encrypted encryption key. If the supplied decryption information is correct, the domain's encryption key will be decrypted and will then be usable to decrypt data records within the domain, such as by using the decryption function referenced by the domain.

It should be noted that while the example domains 420-440 shown in FIG. 4 include records for encryption and decryption functions, such records are not required. Rather, one or more user profiles may be associated with one or more encryption and decryption functions. For example, a user profile may be maintained by a service provider, such as a home security company. The home security company in one example maintains a set of encryption and decryption functions that are used by default to access various domains provided in one or more user profiles, but using the specific encryption keys provided by the respective data owner(s). Thus, when a data owner associated with a particular user profile supplies one or more pieces of information to be stored in the user profile, the data may be encrypted by one of the encryption functions maintained by the home security company. Later, when the data owner supplies information used to decrypt data records within a domain, the data may be decrypted by the appropriate decryption function provided by the home security company. Thus, in some examples, one or more default encryption and decryption functions may be associated with one or more domains.

Once a user profile and one or more domains of the user profile have been established, the user profile may be accessed by any computing system and retrieved. However, because data records referenced by the user profile may be encrypted, the accessing computing system will be unable to interpret the data records, but will instead require the data owner to provide information needed to decrypt any desired data referenced by the user profile.

For example, in the context of a rental car (interchangeably used here as a car sharing service), rental cars frequently sit in a rental lot with keys in the ignition, or may otherwise be ready for anyone to drive at any given time. Thus, rental car lots typically require a renter to pass through an exit station where an employee verifies that the person driving the rental car has a contract with the rental company and is authorized to drive the car they are driving. After authenticating the driver, typically by reviewing a driver's license, and comparing the driver's identity with a rental contract and the car, the driver will be permitted to leave the rental lot. However, it may be possible to instead perform all necessary authentication at the time a driver accesses the vehicle. Further, it should be appreciated that while the following example is described in the context of a rental car, this is merely one example context in which data owner authentication and user profile access may be performed.

In this example, a person rents a rental car from a rental company (interchangeably described as a car sharing service, as described above) for a period of time. Shortly before the rental period begins, the rental company assigns a car from its fleet to the renter. At which time, the assigned car is supplied with a copy of the renter's user profile, which includes several domains of data records. The rental car's infotainment system attempts to access some of the data records within a vehicle settings domain, but determines that they are encrypted. In addition, the rental car's security system attempts to access data records in a biometric information domain, but also determines that the records are encrypted. The security system determines that the decryption function associated with the biometric information domain requires the use of one of the data owner's encryption keys as well as 4-digit PIN number, while the infotainment system determines that the vehicle settings require another encryption key belonging to the data owner.

As the driver approaches the vehicle, the vehicle senses the driver approaching, such as based on images captured by a camera or sensor signals from a proximity sensor, and activates a numeric keypad on the driver-side door. In addition, the rental car attempts to communicate with the driver's smartphone to obtain the driver's private key. In this example, the driver's smartphone automatically pairs with the vehicle via BlueTooth. The vehicle then requests the driver's encryption keys, to which the smartphone responds with a request for the driver's PIN to authenticate the request. The vehicle then illuminates the numeric keypad, and via an external speaker, outputs a voice request for the driver to enter her PIN on the numeric keypad. At which time, the driver enters her PIN. It should be noted that, rather than providing a keypad on the vehicle, the driver's smartphone may indicate the request for the information and the source of the request, and ask the user to authenticate the request by entering her PIN.

After receiving the PIN, the vehicle provides it to the smartphone via an encrypted communication. The smartphone authenticates the PIN, and in response, provides the driver's encryption keys for the biometric parameters and vehicle settings domains. The vehicle's security system then uses one received encryption key and the PIN to decrypt the encryption key for the biometric information domain, while the infotainment system decrypts the encryption key for the vehicle settings domain using the other received encryption key. The vehicle's security system then unlocks the driver-side door, while the infotainment system applies the driver's settings to various systems within the vehicle.

After the driver has entered the vehicle, the security system then attempts to authenticate the driver by sampling biometric information from the driver, such as by capturing an image of the driver's face, or by capturing an image of one of the driver's fingerprints, e.g., via a fingerprint sensor on the dashboard or on the steering wheel. Upon successful capturing a sample of biometric information, the vehicle's security system then attempts to verify the driver's identity based on the biometric information within the driver's user profile. If the vehicle is able to successfully authenticate the driver, the vehicle then enables the vehicle's ignition system (or powers on the vehicle's electric drive system) to allow the user to start the vehicle and begin driving. In addition, the vehicle communicates with the rental company's computer systems to indicate that the vehicle has been successfully obtained by the driver and to begin the rental period.

During the rental period, the driver drives the vehicle to a variety of locations, e.g., to various meetings, meals, and hotels. The vehicle's navigation system tracks the vehicle along these routes and stores the information within a log that is associated with the user profile. For example, the vehicle's navigation system may store information about fueling or charging stations visited to enable the user to quickly locate those stations again in the future.

At the end of the rental period, the driver returns the vehicle to the rental car company (or car share company) and parks the car in a vehicle return area. When she exits the vehicle, the vehicle's security system, which to this point has retained the decrypted encryption keys for the biometric information and vehicle settings domains, detects, e.g., via GPS, that the vehicle is located within the rental company's return area and that the driver has exited the vehicle. The vehicle's security system then initiates a "return mode" during which the vehicle's security system performs multiple "clean-up" processes.

In this example, the vehicle's security system first accesses other systems within the vehicle to obtain information associated the driver that has been collected during the rental period, such as the log information from the navigation system. For some such information, the vehicle's security system simply deletes the information from the respective vehicle system. For other information, such as the log information, the vehicle's security system extracts certain information, such as the location of fueling or charging stations, and adds records to the appropriate domain within the user profile. For example, if the user profile includes a navigation domain, the locations of fueling or charging stations may be added as records to that domain (if those stations are not already identified). In addition, the vehicle's security system may encrypt the navigation log using an encryption key associated with the rental company, and then provide the navigation information to the rental company. The rental company may then use the information to provide better rental options or services in future rental contracts with the driver, or with other drivers.

After the vehicle's security system has updated the user profile with the fueling or charging station information, and provided the encrypted navigation log to the rental company, the vehicle's security system then deletes the driver's encryption keys and PIN information, deletes the vehicle's copy of the user profile, deletes the navigation log and any other information associated with the driver, and resets the various vehicle settings to default settings. Thus, the driver's user profile becomes inaccessible again to the vehicle, any personal information generated in the course of the rental period is erased from the vehicle, and the vehicle is returned to a default state for the next rental driver.

The use of user profiles having multiple different domains may thus enable a data owner to protect the data owner's information, while also allowing access of portions of the profile by various third parties as needed. Further, and according to examples of this disclosure, the data owner may create domains within the user profile and establish encryption or authentication requirements for each domain individually. Thus, as discussed above, more sensitive or personal information may be protected with a greater level of security than less sensitive information. Further, the user may herself select which data records are associated with which domain, thereby selecting not only the level of security provided by each domain, but also which data is assigned to each domain. Such an arrangement allows, in effect, a user to select a level of protection for each individual data record within their user profile.

Figure 5:
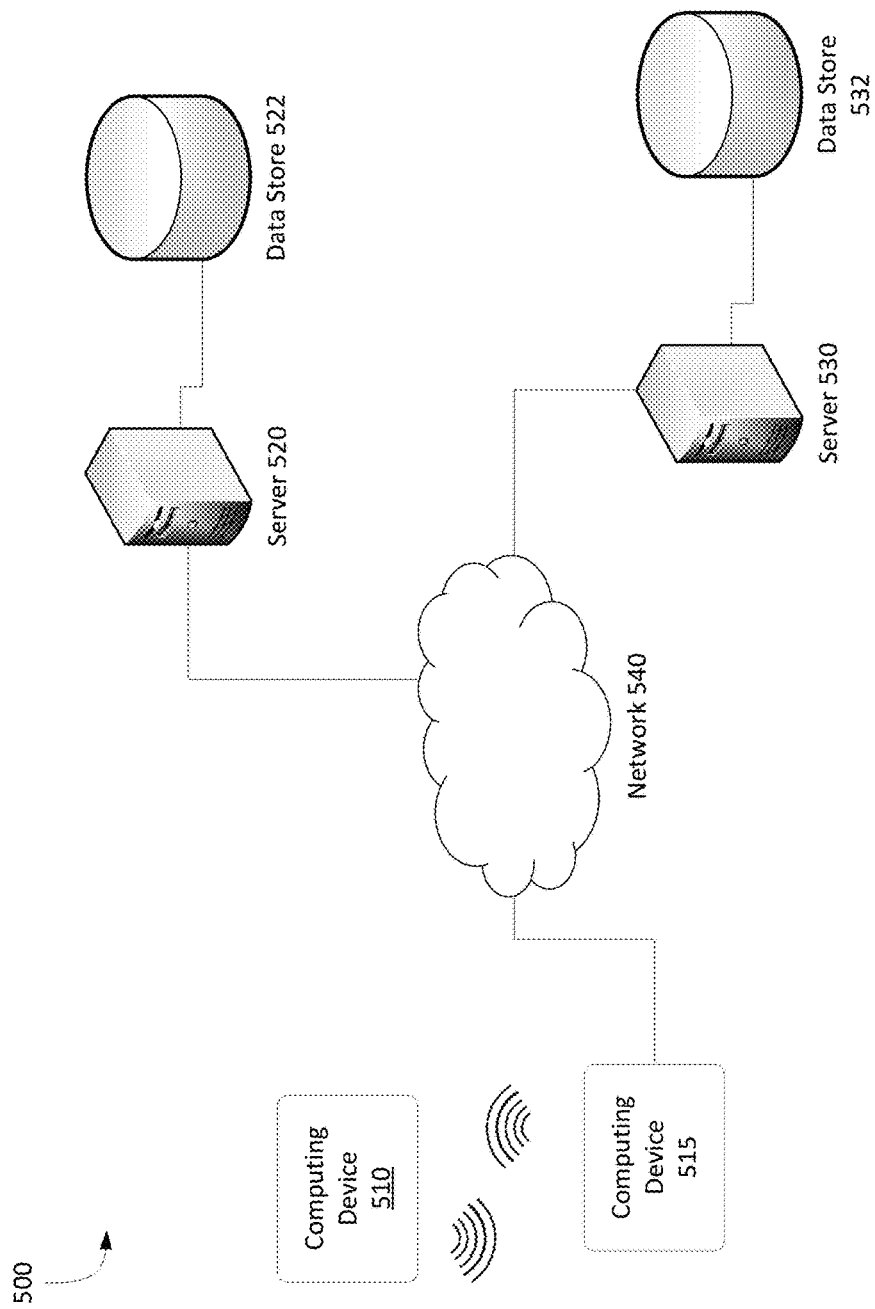
FIG. 5 shows an example system for secure user profiles according to the present disclosure.

Referring now to FIG. 5, FIG. 5 illustrates an example system 500 for secure user profiles. In this example, a first computing device 515 is seeking access to a user profile associated with the user of the user's computing device 510. The system 500 includes the two computing device 510, 515, a first server 520, which is coupled to a first data store 522, and a second server 530, which is coupled to a second data store 532. The first computing device 515 is in communication with each of the servers 520, 530, and is in wireless communication with the user's computing device 510. While, in this example, for simplicity, the user's computing device 510 is not in communication with the servers 520, 530, in other examples, it may be in communication with any or all such servers 520, 530.

In this example, the user's user profile is stored in the data store 522 coupled to the first server 520. As discussed above, the user profile includes several domains, each of which has one or more data records. Data records referenced by the user profile are stored both in data store 522 and data store 532.

In this example, the first server 520 is maintained by an entity, such as rental car company, the user's employer, an insurance company, etc. The entity maintains user profiles for its various users, such as customers or employees, which may enable the respective users to obtain services from the entity, or to authenticate the user to the entity. One example, discussed above, enables a user to gain access to a rental car without intervention of a rental agent. In the context of an employer, a user profile may enable the employer to authenticate a user seeking access to confidential information or to use a corporate resource, such as a company-provided laptop computer.

In some examples, however, the user profile may not be maintained by a particular entity, but instead, may be a user profile that a data owner has generated according to a standardized profile format for use with any computing system that accepts such user profiles. The data owner may store her user profile on a server, such as the first server 520, which may be provided by the data owner herself or may be provide by a network hosting service, such as a cloud service provider.

While the user profile in this example is maintained entirely by the first server 520, in some examples, a user profile may be stored in portions on multiple different data stores. For example, a data owner may create a user profile having a number of different domains. Rather than bodily incorporating each domain into a user profile file or record, a user profile may instead maintain a reference to one or more domains. Suitable references according to different examples may include a uniform resource locater ("URL"), an IP address, a network pathname, a database, etc. Such a distributed user profile may be employed for a variety of reasons, including for example, a user profile that includes domains associated with multiple different service providers.

For example, a user profile may include domains having personal information about the user, such as biometric information, residence information, and medical information. In addition, the user profile may include domains associated with one or more service providers, such as rental car companies, airlines, retail stores, etc. While a data owner may establish a user profile that bodily incorporates each of those domains, which may include one or more data records, or references to data records, into the user profile at a single location, such as in the example user profile 100 shown in FIG. 1, in some examples, the user profile may include an entry indicating a domain that is stored at a different location. Thus, attempts to access data records within such a domain may involve a redirection to the indicated location.

Similarly, data stored in or referenced by a user profile may be stored on any network accessible location, such as in data stores 522 and 523, or any other suitable data storage device. A data record within a domain may be bodily incorporated within the domain, such as in the example user profile 100 shown in FIG. 1. However, a domain may reference a data record, or a portion of a data record, using the techniques discussed above with respect to references to domains. For example, in a distributed user profile, the top level domain of the user profile, e.g., the User_Profile domain in the example user profile 100 of FIG. 1, may contain one or more references to other domains, which in turn may contain one or more references to other domains or to data records. Such domains and data records may be distributed across any number of servers, such as the first and second servers 520, 530 shown in FIG. 5.

Thus, when the first computing device 515 requests access to the data owner's user profile, the user's computing device 510 may provide an indication of the location of the user profile, or at least of the top level domain of the user profile. After receiving the location information, the first computing device 515 may retrieve the user profile from the first server 520, for example, but may require additional information to access domains within the user profile, such as encryption keys or a PIN. After obtaining such information from the user's computing device, the first computing device may access data records stored in one or more domains of the user profile from wherever they are stored, e.g., in one or both of the data stores 522, 532.

Figure 6:
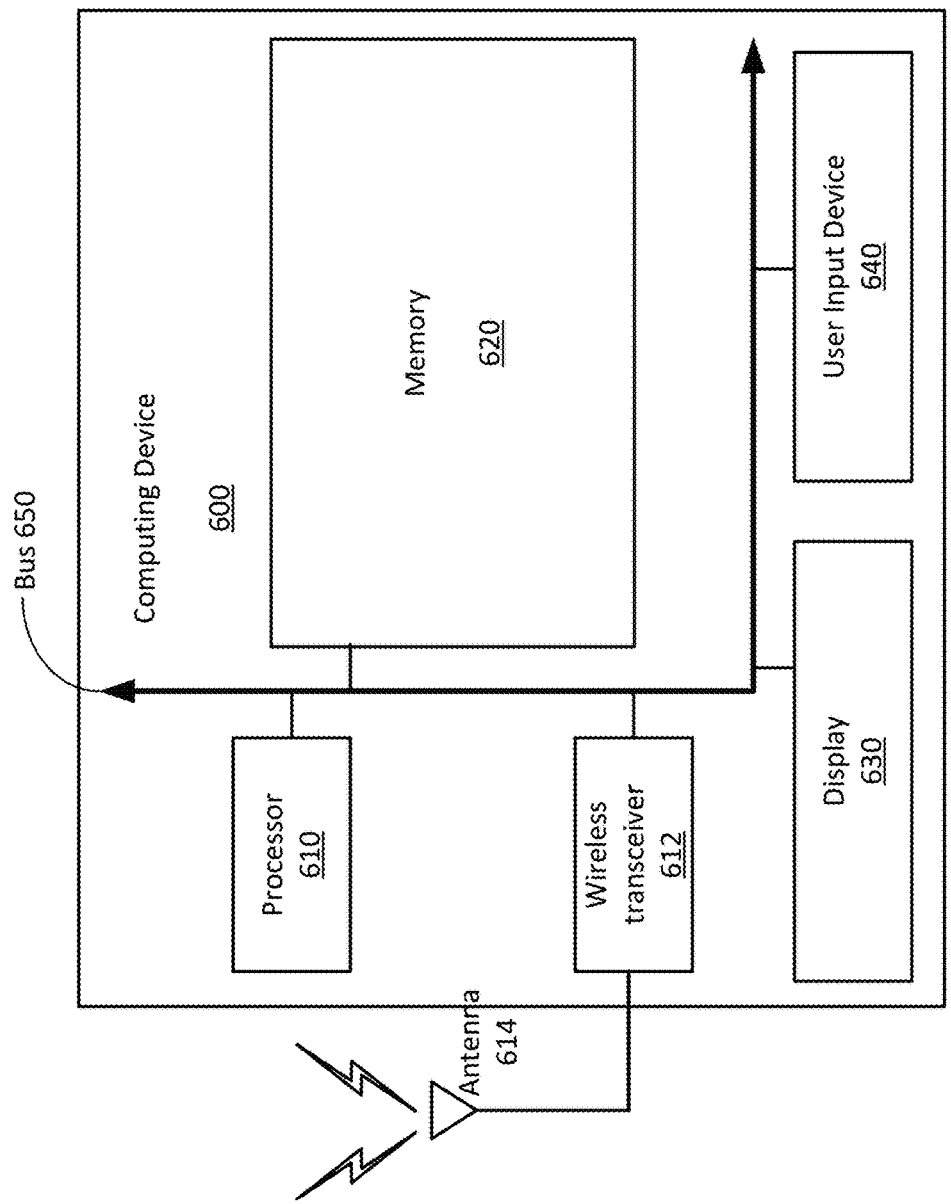
FIG. 6 shows an example computing device for secure user profiles according to the present disclosure.

Referring now to FIG. 6 shows an example computing device 600 suitable for secure user profiles according to this disclosure. For example, the computing devices 510, 515 shown in FIG. 5 may comprise the example computing device 600 of FIG. 6. In the example shown in FIG. 6, the computing device 600 includes a processor 610, a memory 620, a wireless transceiver 612, a display 630, a user input device 640, and a bus 650. In this example, the computing device 600 comprises a smartphone, but may be any suitable device, include an embedded computing device, a cellular phone, a laptop computer, a tablet, a phablet, a personal digital assistant (PDA), or wearable device. The processor 610 is configured to employ bus 650 to execute program code stored in memory 620, to output display signals to a display 630, and to receive input from the user input device 640. Suitable user input devices 640 include touch sensitive input devices (e.g., a touch screen), buttons, mice, keyboards, directional pads, microphones, cameras, etc. In addition, the processor 610 is configured to receive information from the wireless transceiver 612 and to transmit information to the wireless transceiver 612.

The wireless transceiver 612 is configured to transmit and receive wireless signals via antenna 614. For example, the wireless transceiver 612 may be configured to receive radio signals from a wireless access point, another example computing device, e.g., first computing device 515, or other suitable wireless signal transmitter. In some examples, the computing device 600 may include one or more additional wireless transceivers and associated antennas that may be configured to communicate with a cellular base station by transmitting signals to and receiving signals from an antenna associated with the cellular base station.

Figure 7:
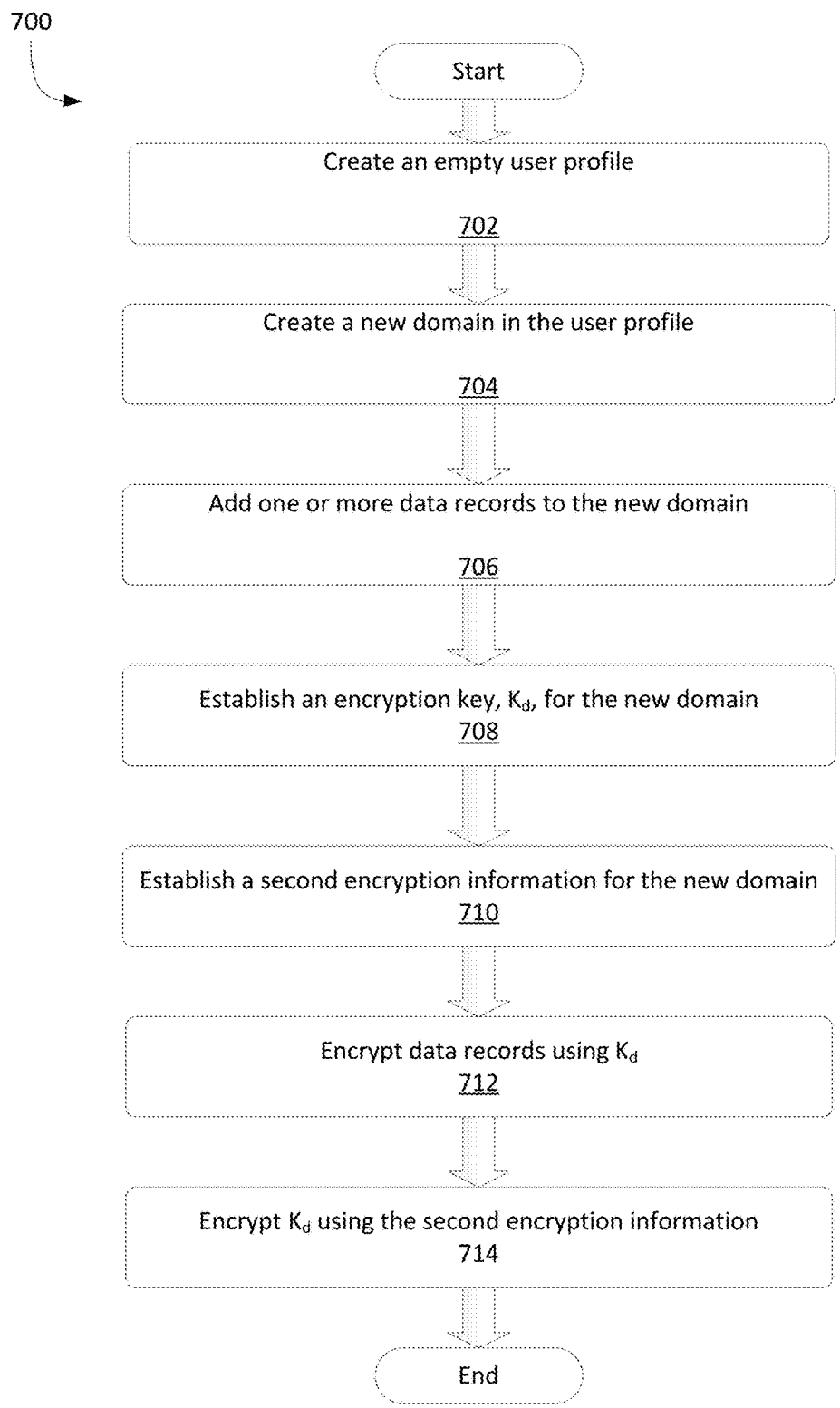
FIGS. 7-9 show example methods for secure user profiles according to the present disclosure.

Referring now to FIG. 7, FIG. 7 illustrates an example method 700 for providing a secure profile according to this disclosure. The method 700 of FIG. 7 will be described with respect to the computing device 600 shown in FIG. 6, however, any suitable computing device may be employed.

At block 702, the computing device 600 creates an empty user profile. In this example, the computing device 600 creates a top level domain having no data records. For example, the computing device 600 may execute a user profile editor in which a data owner selects an option to create a new user profile. In some examples, the computing device 600 may receive a name for the top level domain, such as "user profile" or "Bob's user profile." In some examples, a name for a top level domain may be a randomly-generated name or may be a unique name, whether globally-unique or unique within a particular set of user profiles. In some examples, however, rather than creating a new user profile, a data owner may open an existing user profile for editing.

At block 704, the computing device 600 creates a new domain in the user profile. For example, the computing device 600 may receive a user input indicating a new domain to be added to the top level domain, such as by receiving a selection of a user interface element within the user profile editor. In response to receiving such a user input, the computing device 600 creates a new domain with no data records, and establishes a domain hierarchy where the top level domain inhabits the root of the hierarchy and the new domain is a child of the top level domain in the hierarchy. At block 706, the computing device 600 adds one or more data records to the new domain. For example, the data owner may select an option in the user profile editor to add a new data record to the new domain. The data owner may then enter information into the data record and store the data record as a part of the new domain. In some examples, the data owner may provide metadata about the new data record, such as a name for the data record (e.g., "left thumbprint") or a location in which to store the data record. In this example, the user profile editor creates a new data record using the name supplied by the data owner and stores the supplied information in the data record. For example, the user profile editor may create a new data record of the form "<Name>[Information]</Name>," where "Name" is the metadata name entered by the data owner and "Information" is the information supplied by the data owner. If the user supplied a storage location for the data record, the new data record may instead contain a reference to the storage location, rather than the information itself. In some examples, the user may both supply the information and a storage location. In one such example, the user profile editor may store the information at the storage location and store the reference to the storage location within the data record.

While in this example, the user profile includes only one new domain, in some examples, a user profile may include multiple domains. In one such example, a new data record may be created for a domain by moving a data record from one domain to another domain. To do so, the computing device 600 may first decrypt the data record using the encryption key for the source domain from which the data record is being moved, and then, as will be discussed in more detail below, encrypted using the encryption key for the destination domain.

At block 708, the computing device 600 establishes an encryption key, $K_d$, for the domain. For example, the user profile editor may provide the user with an option to provide encryption protection for the domain. If the data owner elects to provide encryption for the domain, the computing device 600 may allow the data owner to select an encryption technique, e.g., symmetric or asymmetric key encryption techniques, or it may select a default encryption technique. In response to such a selection, the computing device 600 may generate an encryption key, $K_d$, based on the selection.

At block 710, the computing device 600 may generate second encryption information. In this example, the user profile editor prompts the data owner whether to require only encryption or also data owner authentication for the domain. If the data owner elects only encryption, the computing device 600 generates a second encryption key as the second encryption information. However, if the data owner elects to also employ authentication, the computing device 600 generates or receives from the data owner an authentication code, e.g., a PIN or a passcode. In some such examples, the second encryption key and the authentication code make up the second encryption information.

At block 712, the computing device 600 encrypts the data records in the new domain using the encryption key, $K_d$. In this example, the computing device 600 executes the selected encryption technique and supplies the encryption key, $K_d$, to individually encrypt each data record. However, in some examples, the computing device may encrypt all data records together in a single execution of the encryption technique.

At block 714, the computing device 600 encrypts $K_d$ using the second encryption information. For example, if the data owner has elected only to use encryption to encrypt $K_d$, the computing device 600 applies an encryption technique to $K_d$ using the second encryption key. However, if the data owner has elected to use both encryption and authentication, the computing device 600 applies an encryption technique to $K_d$ using the second encryption key and the authentication code.

After encrypting the data records in the new domain, and the encryption key, $K_d$, the method 700 ends. However, in some examples, the method 700 may return to earlier blocks to add additional domains or data records. For example, the method may return to block 704, where an additional new domain may be created. In some examples, the steps of method 700 may not be performed in the order specified. For example, block 704 may be performed multiple times in succession to create multiple new domains before any data records are created, or after data records for only some domains have been created, at block 706.

Figure 8:
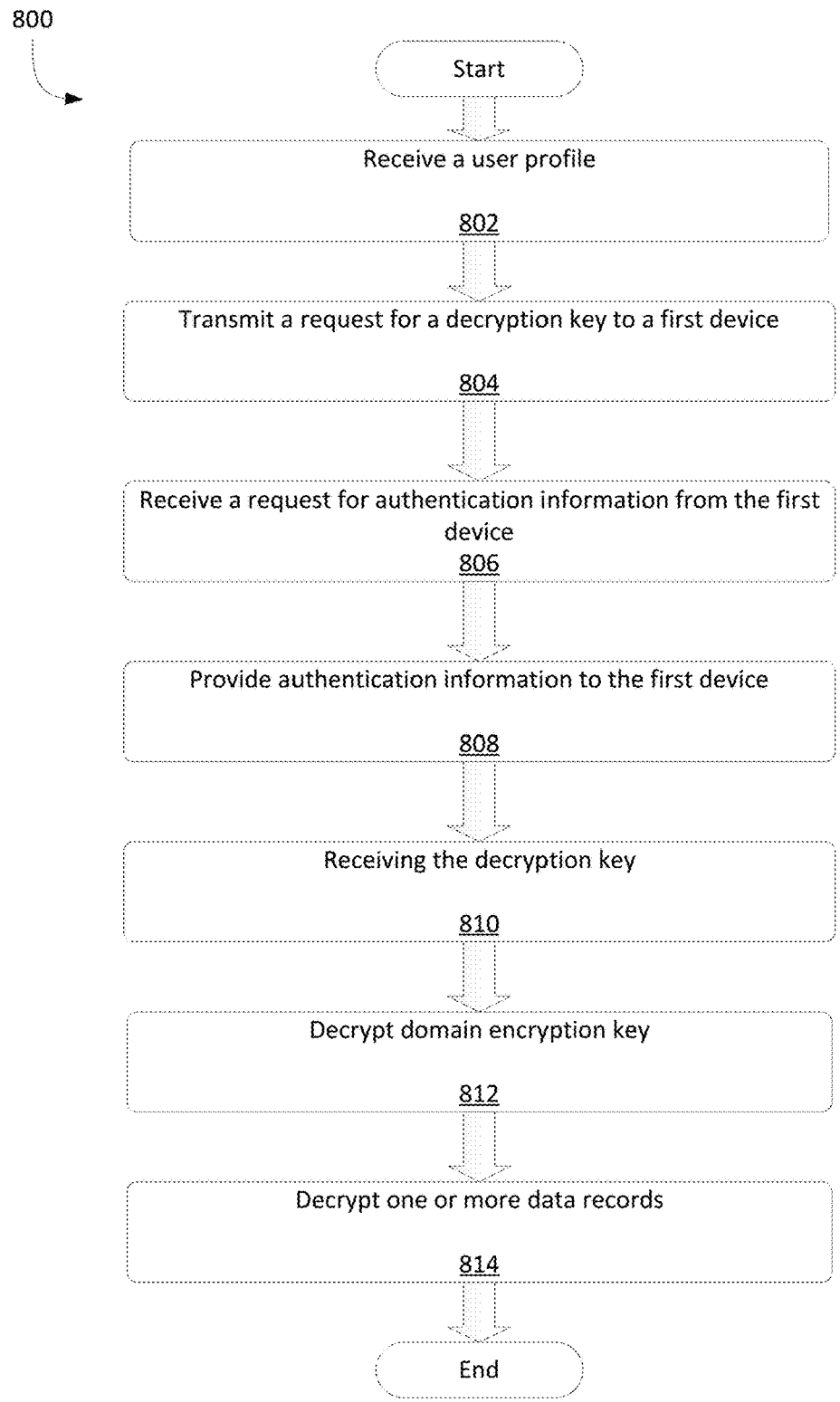

Referring now to FIG. 8, FIG. 8 shows an example method 800 for using a secure user profile according to this disclosure. The method 800 of FIG. 8 will be described with respect to the system 500 shown in FIG. 5 and the computing device 600 shown in FIG. 6, however, any suitable system or computing device may be employed.

At block 802, the computing device 600 receives a user profile. In this example, the user profile is supplied by a remote computing device, such as the first server 520 shown in FIG. 5, or from a data owner's computing device, e.g., a data owner's smartphone. However, in some examples, the computing device 600 may receive the user profile from its memory 620.

At block 804, the computing device 600 transmits a request for a decryption key to a first device. For example, the computing device 600 may wirelessly transmit, e.g., via BlueTooth, a request for the decryption key to a device associated with the data owner, such as the user's computing device 515 shown in FIG. 5.

At block 806, the computing device 600 receives a request for authentication information from the first device. For example, the computing device 600 may receive a request for a PIN or a passcode associated with the data owner from the first device. In some examples, the request may indicate the type of information requested, e.g., a PIN, though in some examples, the request may simply indicate that authentication information is required.

At block 808, the computing device 600 provides the requested authentication information to the first device. For example, in response to receiving the request for the authentication information, the computing device 600 may prompt the data owner to entry to requested authentication information. However, in some examples, the computing device 600 may simply wait to receive the authentication information from the data owner. For example, the computing device 600 may have an RFID reader and wait for the data owner to swipe an identification card having an RFID tag. The RFID reader may then read authentication information from the RFID tag, such as an employee identification number. The computing device 600 then provides the authentication information to the first device.

At block 810, after providing the authentication information to the first device, the computing device 600 receives the requested encryption key from the first device. For example, the computing device 600 receives the encryption key from the data owner's smartphone or tablet device.

At block 812, the computing device 600 decrypts a domain encryption key using the received encryption key. As discussed with respect to examples above, a domain may have an associated encryption key, which may in turn be encrypted using another encryption key. Thus, after receiving the encryption key from the first device, the computing device 600 may then decrypt the domain encryption key. In this example, however, the computing device 600 may use both the encryption key and the authentication information to decrypt the domain encryption key. As discussed above, a domain encryption key may be encrypted using an encryption technique that employs multiple pieces of information to encrypt or decrypt the encryption key.

At block 814, the computing device 600 decrypts one or more data records in the domain using the decrypted domain encryption key. As discussed above, data records within a domain may be encrypted by an encryption technique that uses the domain encryption key. Thus, the computing device 600, after decrypting the domain encryption key, may decrypt one or more data records within the domain.

It should be appreciated that all of the steps performed in the method 800 shown in FIG. 8 need not be performed. For example, authentication information may not be required to obtain the encryption key, or the authentication information may have already been supplied to the first device, thus blocks 806 and 808 may not occur. Further, the method 800 may be performed multiple times if multiple different domains within a user profile have encryption keys. Thus, the computing device 600 may request multiple encryption keys, each associated with a different domain, from the first device, or from multiple different devices.

Figure 9:
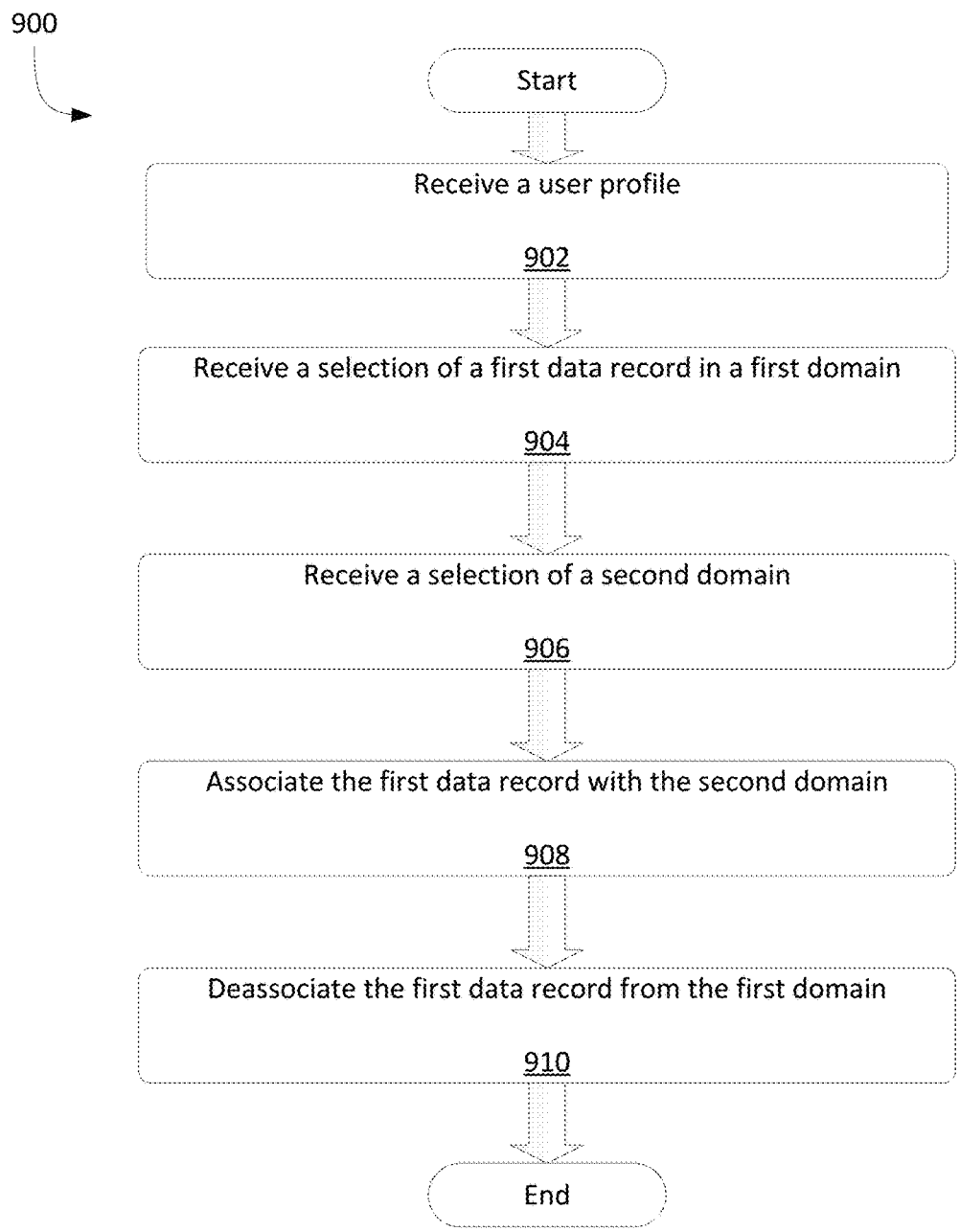

Referring now to FIG. 9, FIG. 9 shows an example method 900 for using a secure user profile according to this disclosure. The method 900 of FIG. 9 will be described with respect to the computing device 600 shown in FIG. 6, however, any suitable computing device may be employed.

At block 902, the computing device 902 receives a user profile as described above with respect to block 802 of the method 800 of FIG. 8. In some examples, the computing device 600 may perform the method of FIG. 8 to decrypt one or more data records within the user profile.

At block 904, the computing device 600 receives a selection of a first data record in a first domain. For example, the computing device 600 executes a user profile editor and provides a visual representation of the user profile on a touch-sensitive display. The data owner makes a selection of a data record in the first domain, e.g., by using a mouse or by touching a location on the touch-sensitive display.

At block 906, the computing device 600 receives a selection of a second domain. For example, the data owner may drag the selected data record from the first domain to the second domain. In some examples, the user may execute a cut/paste command by first executing the "cut" command on the selected data record, then selecting the second domain and executing the "paste" command.

At block 908, the computing device 600 associates the first data record with the second domain. For example, the computing device 600 may create a new data record in the second domain and copy the information from the first data record into the new data record. In some examples, the computing device 600 may insert the first data record into the second domain, such as by inserting an XML or similar statement into a data file storing the user profile at a location corresponding to the second domain. In some examples, associating the first data record with the second domain may comprise decrypting the information in the data record using the encryption key for the first domain and then, if the second domain has an associated encryption key, encrypting the first data record using the encryption key for the second domain.

At block 910, the computing device 600 deassociates the first data record from the first domain. For example, the computing device 600 may delete an XML statement from the first domain in the user profile data file.

It should be appreciated that the method 900 of FIG. 9 may be performed any number of times to change the arrangement of data records or domains within a user profile.

While some examples of methods and systems herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The invention claimed is:

1. A method comprising:
receiving a user profile, the user profile comprising a plurality of domains including a first and second domain, the first domain having an associated encryption key and at least one associated data record, wherein the first encryption key is encrypted according to a first encryption technique and wherein the at least one data record is encrypted according to a second encryption technique using the first encryption key;
receiving a selection of the at least one associated data record;
receiving a selection of the second domain; and
subsequent to receiving the selection of the at least one data record and the second domain, associate the at least one data record with the second domain, and de-associate the at least one data record from the first domain;
wherein associating the at least one data record with the second domain comprises:
transmitting a request for a decryption key to a first device, the decryption key usable by the first encryption technique to decrypt the first encryption key;
receiving the decryption key from the first device;
decrypting the first encryption key using the first encryption technique and the decryption key; and
decrypting the at least one data record using the second encryption technique and the first encryption key.

2. The method of claim 1, further comprising:
receiving a request for authentication information from the first device; and
in response to the request and prior to receiving the decryption key, providing the authentication information to the first device.

3. The method of claim 1, wherein the at least one data record comprises biometric information about a person, and further comprising:
capturing a biometric sample of the person;
comparing the biometric sample to the biometric information; and
responsive to the biometric sample matching the biometric information, authenticating the person.

4. A method comprising:
receiving a user profile, the user profile comprising a first domain and a second domain, the first domain having an associated encryption key, the second domain having an associated first data record;
receiving a selection of the first data record;
receiving a selection of the first domain;
subsequent to receiving the selection of the first data record and the first domain, associating the first data record with the first domain, and de associating the first data record from the second domain; and
subsequently encrypting the first data record using a first encryption technique and the encryption key.

5. The method of claim 4, wherein the second domain has an associated second encryption key, and wherein associating the first data record with the first domain comprises decrypting the first data record using a second encryption technique and the second encryption key.

6. The method of claim 4, further comprising, prior to associating the first data record with the first domain and de-associating the first data record from the second domain, authenticating a data owner of the user profile.

7. A system comprising:
a hardware processor configured to:
receive a user profile, the user profile comprising a plurality of domains including a first and second domain, the first domain having an associated encryption key and at least one associated data record, wherein the first encryption key is encrypted according to a first encryption technique, and wherein the at least one data record is encrypted according to a second encryption technique using the first encryption key;
receive a selection of the at least one data record;
receive a selection of the second domain; and
subsequent to receiving the selection of the at least one data record and the second domain, associate the at least one data record with the second domain, and de-associate the at least one data record from the first domain;
wherein, in associating the at least one data record with the second domain, the processor is further configured to:
transmit a request for a decryption key to a first device, the decryption key usable by the first encryption technique to decrypt the first encryption key;
receive the decryption key from the first device;
decrypt the first encryption key using the first encryption technique and the decryption key; and
decrypt the at least one data record using the second encryption technique and the first encryption key.

8. The system of claim 7, wherein the hardware processor is further configured to receive a request for authentication information from the first device; and
in response to the request and prior to receiving the decryption key, provide the authentication information to the first device.

9. The system of claim 7, wherein the at least one data record comprises biometric information about a person, and wherein the hardware processor is further configured to:
capture a biometric sample of the person;
compare the biometric sample to the biometric information; and
responsive to the biometric sample matching the biometric information, authenticate the person.

10. A vehicle incorporating the system of claim 7.

* * * * *